United States Patent [19]
McMurtry

[11] 3,770,942
[45] Nov. 6, 1973

[54] OPTICAL BAR CODING SCANNING DEVICE

[75] Inventor: David Harwood McMurtry, Portola Valley, Calif.

[73] Assignee: International Business Machines Corporation, Armonk, N.Y.

[22] Filed: Feb. 14, 1972

[21] Appl. No.: 225,895

[52] U.S. Cl.235/61.11 E, 250/219 RG, 235/61.12 N, 340/146.3 MA

[51] Int. Cl... G06k 7/14, G06k 19/06, G01n 21/30, G06k 9/13

[58] Field of Search .................. 250/219 RG, 211 J, 250/203, 219 DR, 233; 340/146.3 MR, 146.3 H, 146.3 F, 347 AD; 235/61.11 E, 61.11 F, 61.12 N, 61.12 R

[56] References Cited

UNITED STATES PATENTS

| | | | |
|---|---|---|---|
| 3,506,837 | 4/1970 | Majima | 250/219 DR |
| 3,255,437 | 6/1966 | Singer | 340/146.3 MA |
| 3,643,068 | 2/1972 | Mohan | 235/61.11 E |
| 3,553,438 | 1/1971 | Blitz | 235/61.11 E |
| 3,414,731 | 12/1968 | Sperry | 250/219 D |
| 3,636,317 | 1/1972 | Torrey | 235/61.12 N |
| 2,568,543 | 9/1951 | Goldsmith | 250/219 DR |
| 3,416,152 | 12/1968 | Trilling | 340/347 AD |

*Primary Examiner*—Daryl W. Cook
*Assistant Examiner*—Robert M. Kilgore
*Attorney*—George E. Roush et al.

[57] ABSTRACT

The scanning of documents bearing optical bar coding, particularly with hand-held scanning apparatus, is enhanced by an optical system effecting a pointed elongated aperture substantially parallel to the bars without constriction as to the orientation of the apparatus. A photosensitive diode arrangement of substantially circular configuration is divided into a multiple of radially extending pointed sectors isolated from each other, and diametrically collinear sectors are connected together as sector-couples. Light from the document striking the array of sector-couples produces a maximum on all sector-couples scanning the background and a minimum on one sector-couple or on at least a few sector-couples scanning bars against the background. The devices are effectively rotating under control of electronic circuitry for viewing the bars at a multiple of angular positions. Further electronic circuitry determines the sector-couple having the minimum response and which selects that couple for the completion of the scanning operation or until disorientation dictates another selection. Several configurations effecting pointed aperture stops are disclosed. An alternate embodiment comprises a circular photosensitive section insulated from the sectors and located centrally of the sector couples. In this embodiment the photosensitive section is connected to the chosen sector-couple for improved resolution.

19 Claims, 15 Drawing Figures

OPTICAL BAR CODING SCANNING DEVICE

The invention stems from those endeavors from which the inventions disclosed and claimed in the copending U. S. Patent applications Ser. No. 31,959 of Ernie George Nassimbene filed on the 27th day of April 1970 for "Retrospective Pulse Modulation and Apparatus Therefor", a division of which issued on the 2nd day of January, 1973, as U. S. Pat. No.

3,708,748, Ser. No. 131,234 of Thomas Frank O'-Rourke filed on the 5th day of April 1971 for "RPM Coding and Decoding Apparatus Therefor," Ser. No. 158,466 of David Harwood McMurtry for "Hand Probe for Manually Operated Scanning System," Ser. No. 223,555 of Jerome Danforth Harr and David Harwood McMurtry filed on the 4th day of February, 1972, for "Hand Held Probe for Manually Read Optical Scanning System." It particularly is an improvement on the photosensitive device disclosed in the copending U. S. Patent application Ser. No. 198,331 of Jerome Danforth Harr filed on the 12th day of November 1971 for "Optical Bar Coding Scanning Apparatus."

The invention relates to optical scanning apparatus for sensing information recorded in a series of vertical lines or bars substantially parallel to each other, and it particularly pertains to photosensitive devices for hand-held optical scanning apparatus and/or machine scanning apparatus of extremely loose tolerances in either or both the machine and/or the recording of the bars on the document being scanned.

In optical mark scanning apparatus, the size and shape of the photosensitive area effective in sensing aligned with the marks to be sensed. This is a difficult task for the operator of a manual scanning apparatus and the same problems are the information has a large effect on the reliability and the usability of the system. If the effective photosensitive area is a long, narrow rectangle, the sensing area is large and a large signal-to-noise ratio obtains. However, that rectangular area must be aligned and the same problems are present to a degree in machine scanning apparatus. Photosensitive devices with circular configuraitons have been suggested. These configurations are free from orientation problems but the signal-to-noise ratio suffers due to the small area and reliability is likewise low.

The state of the prior art with respect to these and allied problems is reflected in the following U. S. Patents:

| | | | |
|---|---|---|---|
| 3,229,075 | 1/1966 | Palti | 235–61.11 |
| 3,327,584 | 6/1967 | Kissinger | 88–14 |
| 3,414,731 | 12/1968 | Sperry | 250–219 |

and the technical literature: R. E. Bonner, "Pattern Recognition System Using Controllable Non-uniform Raster, " IBM Technical Disclosure Bulletin, Vol. 6, No. 9, Feb. 1964, p. 85; M. Trauring "Automatic Comparison of Finger-Ridge Patterns," Nature, Vol. 197, Mar. 9, 1963, pp. 938–940

The objects of the invention indirectly referred to hereinbefore and those that will appear as the description progresses obtain in an optical bar code scanning system effecting a rotatable elongated optical pupil aligned with the bars at the document in optimum angular relationship for sensing reflection and/or absorption of light therefrom.

A basic concept of the invention comprises an optical system providing a rotating optical pupil resulting from an elongated optical aperture stop which is dimensionally proportional to the bars of the coding. Light from a suitable source is transmitted to a suitable photosensitive device by reflection from the document bearing printed coding bars.

In the copending U. S. Patent application Ser. No. 198,331 there is described a sectored photosensitive device arranged in an optical scanning system wherein the sectored photosensitive device is substantially fixed from the rotational standpoint and the diametrically collinear sectors of configuration constituting the aperture stop are connected together electrically to form sector-couples. In an alternate embodiment of this device a central photosensitive section of the array is electrically isolated from the sectors but functionally coupled in operation for improving the operation of one or all sector-couples.

In a basic mode of operation the photosensitive sector-couple most nearly aligned with the bars is selected for sensing in normal manner with or without inclusion of the central photosensitive section. It is a distinct advantage of the structure of the invention, however, that the other sector-couples, especially those immediately adjoining the most nearly aligned sector-couple be continuously monitored and in the event that a different sector-couple become more nearly aligned, as might be due to inadvertent rotation of hand held apparatus, that different sector-couple be substituted for the remainder of the scan or portion thereof during which the different sector-couple is most nearly aligned. Electronic circuitry is arranged for determining the alignment of at least the most nearly aligned sector-couple and for switching sector couples automatically.

Parallel and serial multiplexing of sector-couples in a continuing sampling mode of operation are effective. These arrangement continuously compare the output of a selected sector-couple with outputs of all other sector-couples and automatically switch to the most nearly aligned sector-couple.

According to the invention photosensitive arrays of the above-described type and arranged with sectors radiating from the center and terminating in photosensitive areas principally defined by lines converging to points remote from the center. The lines are arranged at an angle of $2\theta$ with respect to each other, where $\theta$ is one half the proportion of a circle to the number of segments. This subtended by a circle of radius equal to one half of the minimum spacing to be resolved. Triangular sectors from one embodiment with either sharp tips or tips truncated by rounding or blunt lines. These triangular sectors begin at some distance from the center; a distance of one half the overall radius is contemplated.

In another embodiment, substantially triangular intermediate areas lie between the above-described triangular areas thereby forming overall sectors of substantially rhombic configuration for greater response to light and dark spaces to be scanned.

A further embodiment provides even more photosensitive area for each sector. In this arrangement the envolope defining the sectors comprise lines intersecting at the points remote from the center which are also tangent to a circle at the center of diameter substantially equal to the the shortest space to be resolved by the system. This configuration inherently involves overlapping areas in an array. Therefore each sector of a sector-couple comprises a diamond-shaped outer sub-sector and two intermediate triangular sub-sectors, one from each adjacent envelope. Switching the sub-sectors in this arrangement is more complex but is justified in some applications by the gain in area.

In order that full advantage of the invention may be obtained in practice, preferred embodiments thereof, given by way of examples only, are described in detail hereinafter with reference to the accompanying drawing, forming a part of the specification and in which.

Figure 5:
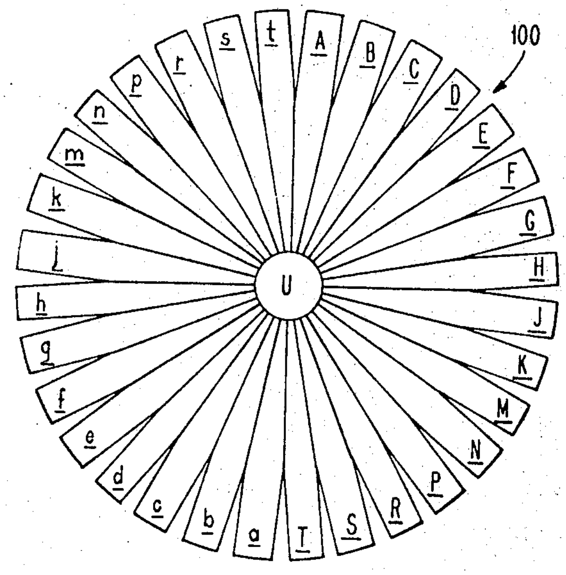
Figure 6:
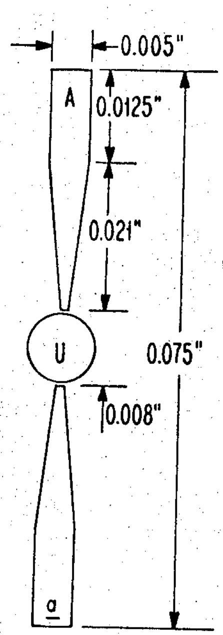
Figure 7:
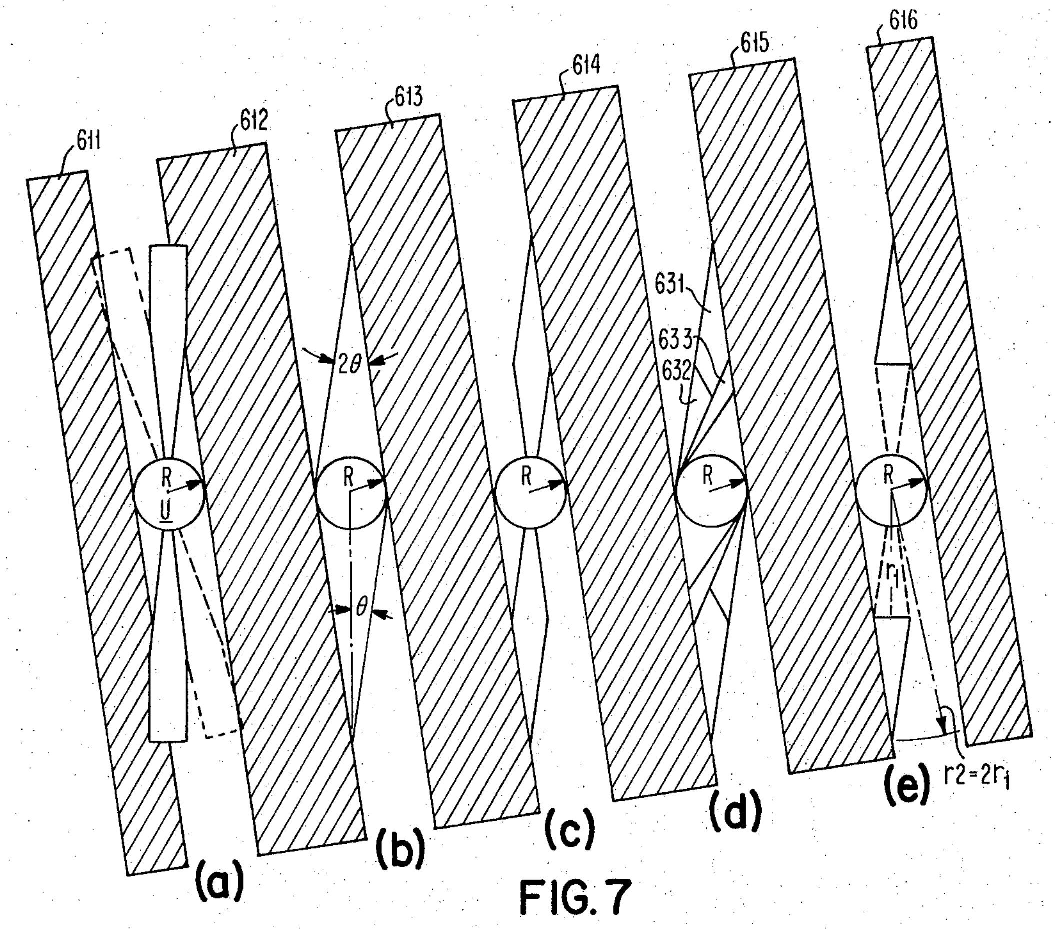
Figure 8:
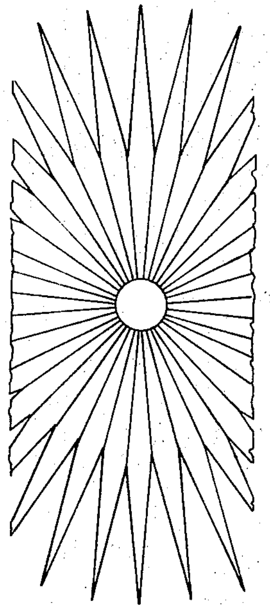
Figure 9:
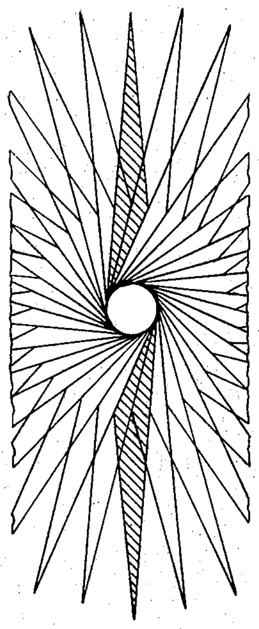
Figure 10:
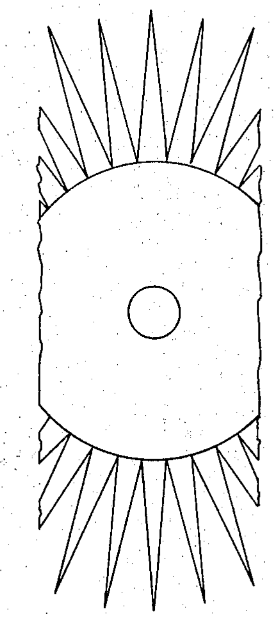

FIGS. 5 and 6 are illustrations of a photosensitive device according to the copending U. S. Patent application Ser. No. 198,331;

FIG. 7 provides a comparison of photosensitive sector-couples according to the invention as optically imaged between printed coding bars of a document;

FIGS. 8–10 illustrate photosensitive arrays according to the invention; and

FIGS. 11–15 are graphical representations of waveforms obtained with the photosensitive devices according to the invention.

Figure 1:
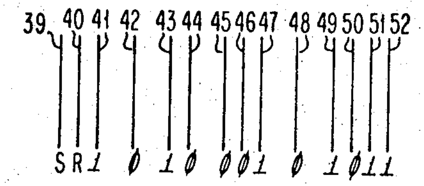
FIGS. 1 and 2 are graphical representations of two forms of optical bar coding for which apparatus according to the invention is intended to sense.
Figure 2:
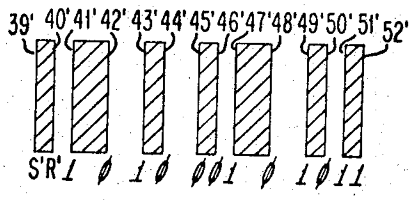

Two examples of bar coding for which the scanning apparatus according to the invention was developed are shown in FIGS. 1 and 2, but it should be clearly understood that the apparatus according to the invention is equally adaptable to almost all, if not all, other bar coding arrangements, since those skilled in the art will readily adapt the teachings herein to the particular bar coding scheme at hand. FIG. 1 illustrates the underlying principle of RPM (retrospective pulse modulation) bar coding as described and claimed in the copending U. S. patent application Ser. No. 31,959 hereinbefore mentioned. Information in the form of a 12 order binary number, 101000101011 is coded in this general example. A series of parallel lines 39–52 are arranged for conversion into a train of narrow electric pulses by photosensitive apparatus according to the invention. The data is established at time intervals proportional to the spacing between the lines 39–52. A start line or bar 39 is followed at a predetermined spacing by a reference bar 40 for initiating the retrospective coding. The first information manifesting bar 41 follows a reference 40 by a spacing substantially equal to the spacing between the start bar 39 and the reference bar 40 to manifest a binary unit; obviously a binary unit; obviously a binary naught might better be manifested by this arrangement depending upon the situation facing the designer. The following bar 42 is arranged on the former basis to denote a binary naught by spacing the bar 42 substantially twice the distance from the preceding bar 11 as that bar follows the reference bar 40. The information is carried essentially by the spacing between bars. Accordingly there is illustrated an example of each of the possibilities of data manifestation in basic binary digit RPM coding where the immediate preceding spacing is reflected in the spacing of the digit under consideration.

In FIG. 2 the same binary data is manifested by the transitions between highly contrasted white and black areas. Apparatus according to the invention is passed over this transition-significant form at RPM bar coding from a point before the starting edge 39′ to a point beyond the final edge 54′. An electric pulse signal is developed at each transition from white to black and again from black to white. Preferably a differentiating process is involved in either case. Each differential pulse is significant with respect to data in the transition significant form whereas alternate pulses are not in the basic example. This difference is of immediate importance in increasing the density of the coded data and in the elimination of superfluous pulses in the data signal which may interfere as though spurious. In the transition significant arrangement it is necessary to add an "inter-character gap" of one bit space to separate the last dark bit space from the first dark bit space of the succeeding character.

Figure 3:
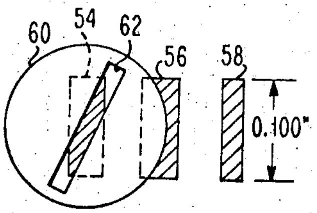
FIG. 3 illustrates the use of a rotating elongated aperture stop in an optical system for scanning bar coding.

FIG. 3 illustrates the basic problem. Three bars 54, 56, and 58 in typical configuration are recorded on a document. An aperture stop plate 60 having an elongated rectangular aperture 62 forms a basic part of the scanning apparatus. The aperture 62 is proportional to the bars to be sensed. In this figure it is assumed that the optical pupil and the aperture stop are identical. It must be understood, however, that optical magnification or reduction may well be involved in the optical system of the overall apparatus. The plate 60 is used in this illustration for better contrasting the pupil from the bars and is shown skewed with respect to the bars 54–58 for emphasizing the difficuly with prior art arrangements. According to the invention, the aperture plate 60 is rotated at a predetermined rate of rotation much faster than the rate of scan. With such an arrangement there are two angles (180° apart) for each revolution at which the aperture 62 is on line in the same longitudinal direction as the bar 54. Ambient light will pass at all angles except those two particular angles, when the aperture is centered over a bar. The arrangement preferably is further disposed so that the photosensitive device is exposed to light passing through the aperture stop 62 only at those two particular angles plus or minus a small angular tolerance.

Figure 4:
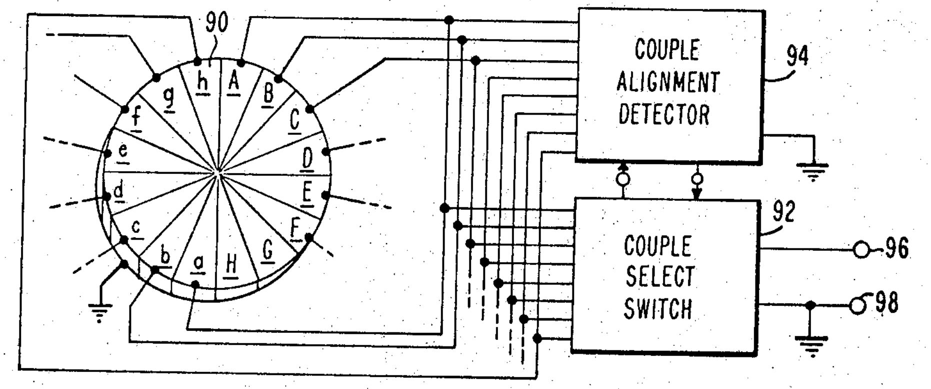
FIG. 4 is a schematic functional diagram of electronic bar coding scanning apparatus for utilizing a photosensitive device array according to the invention.

The photoresponsive device 90 as shown in FIG. 4 is a generic illustration of a substantially circular photocell arrangement having 16 equal sectors A, B, ... G, H and *a*, *b*, ... *g*, and h laid down on a substrate in conventional manner. No further description will be given of the construction of such a device as the fabrication in and of itself is not a part of the invention. A backing electrode is common to all of the sectors and is arranged with an electric lead for connection to a point of reference potential which is shown in this illustration as being at ground potential. The sectors are insulated from each other and are connected in diametrically collinear pairs or couples as A*a*, B*b* ... H*h*. The sector-couples are connected to a couple-selecting switching circuit arrangement 92 and also to a couple-alignment detecting circuit arrangement 94. The sector-couples are selected sequentially, for example, at the beginning of a scanning operation and the couple alignment detecting circuit arrangement 94 determines which couple receives the minimum amount of light when centered over a mark, (or maximum light when centered over clear space) as this indicates the closest sector-couple aligned with the marks. The couple alignment detector circuit arrangement then fixes the couple-selecting switch on that particular sector-couple for operation for the remainder of the scan and light output levels are delivered at output terminals 96 and 98.

The layout diagram of a sectored photosensitive device as disclosed in the copending U. S. Patent application Ser. No. 198,331 is shown in FIG. 5. The device 100 comprises 32 sectors arranged at angles of approximately 11.25°. In this arrangement there is also a central photosensitive sections U which is insulated from all of the other sections A-*h*. One sector couple Aa and the central section U are shown separated from the remainder of the array in FIG. 6. The sector-couples are electronically time division multiplexed, or otherwise operated, so that the result is a scanner which acts very much like the mechanical scanners described hereinbefore.

Electronic circuitry and component assemblies for digital data processing afford savings in most cases for binary arithmetical operations. Therefore, thirty two sectors or sixteen sector-couples are contemplated in the devices yet to be described. However, it will be apparent to those skilled in the art that the number of sectors and sector-couples may be chosen from a large range of numbers as suits the application at hand. In the configuration of the sectored photocell device shown in FIG. 5 there are 32 sectors inclined 11.25° to one another. The radius R of the central section U is one half the minimum spacing D for the RPM coding.

FIG. 7 depicts a series of black bars 611–616 representing the binary number 1000000001 in RPM bar coding. FIG. 7(*a*) shows one sector-couple A-*a* of the array of FIG. 5 in an orientation at which two sector-couples are aligned ±5.63° from the zero line. Either of these two sector-couples will be selected for the scan. While all of the blade area of a selected sector-couple is over the white space to be scanned in intermediate angles, only about 85 percent of the outer sector area covers the white space where two sector-couples are substantially equally aligned; the other 15 percent of the outer sector area senses black instead of white.

The photosensitive array in all probability is angularly oriented on the bar code pattern in a random fashion for most of the scanning operations. Thus, a certain percentage of the narrowest white spaces (and narrowest black bars) usually will be scanned by a sector-couple with less than 100 percent of potential maximum photocell signal. Since the purpose of the device is to detect the difference between black bars and white spaces, the reliability of the scanner having sectors as shown in FIG. 7(*a*) will fall short of that desired.

FIG. 7(*b*) shows a sector configuration which will attain the maximum 100 percent photocell signal in each case as it is oriented about the vertical reference. The tip angle $2\theta$ is 22.5° and the sector area is a maximum. This particular configuration is practically impossible to implement in a segmented photocell array because of geometrical overlap.

However, modifications to the base of each sector eliminate the overlap at the expense of area. The sector configuration for a full "star" array is shown in FIG. 7(*c*). It can be seen from the latter figure that there is a full photocell signal throughout the range of ±5.625° in which a given sector-couple operates. An illustration of this "star" array is provided by FIG. 8.

Several variations on this basic theme are possible. At FIG. 7(*d*) there is shown a segmented sector array which closely approximates the ideal sector of FIG. 7(*b*) for producing a larger signal. For clarity, this segmented version is shown in FIG. 9. Each photosensitive sector unit comprises a peripheral diamond-shaped sector 631 and 2 base areas 632,633 of essentially triangular shape.

The peripheral diamond-shaped sectors are switched as in the arrangements hereinbefore described. The base triangular areas are shared with adjacent sectors and are arranged to be switched "out of phase" with the peripheral diamond-shaped sectors. More switching is required but a greater overall total area is available for absorbing "noise" caused by specks of dirt and the like in the white spaces and holidays in the black bars.

The basic shape of the array is readily modified by truncating the base of the sectors to a greater or lesser degree. One level of truncation, depicted at FIG. 7(*e*), produces a "half-star" array as shown in FIG. 10. This array produces different electric waveforms and as discussed hereinafter.

The areas of the different sector configurations as a function of center section radius is given in the table below.

| Configuration | Area of sector-couple | Area including center section |
|---|---|---|
| FIG. 7(*a*) Daisy | 15.44 $R^2$ | 18.58 $R^2$ |
| FIG. 7(*b*) Diamond | 19.22 $R^2$ | 22.36 $R^2$ |
| FIG. 7(*c*) Star | 10.04 $R^2$ | 13.18 $R^2$ |
| FIG. 7(*d*) Segmented | 13.60 $R^2$ | 16.74 $R^2$ |
| FIG. 7(*e*) Half-Star | 5.13 $R^2$ | 8.27 $R^2$ |

Figure 11:
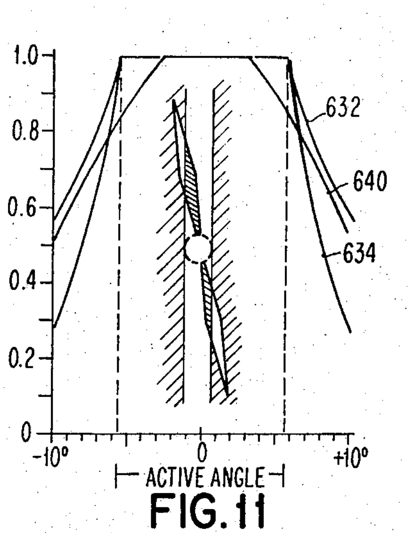

The waveforms produced by rotating sector-couples whose center sections are aligned in a narrow white space are compared in FIG. 11. The curve 640 represents the waveform for the "Daisy" configuration of FIG. 7(*a*), while the curves 632 and 634 represent the waveforms for the "star" and "half star" configurations respectively. The angle of orientation is plotted as the abscissas against the ratio of blade area exposed to the total blade area as the ordinates. Note the fully exposed areas during active angle of ±5.625° for both "star" configurations. The "daisy" configuration starts losing exposed area after ±3°.

Figure 12:
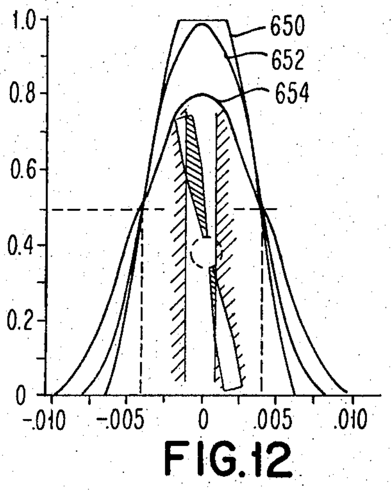

FIG. 12 shows the variation in exposed blade area as the "daisy" configuration is scanned across a narrow white space at varying angles of orientation. The curves 650, 652 and 654 represent the orientation angles of 0° 3° and 5.625° from the vertical against the offset in inches from the center of the white space as the abscissas. Note the maximum area decreases from 100 percent as the angle or orientation increases and that the curves have identical values at the 50 percent area line due to blade symmetry.

Figure 13:
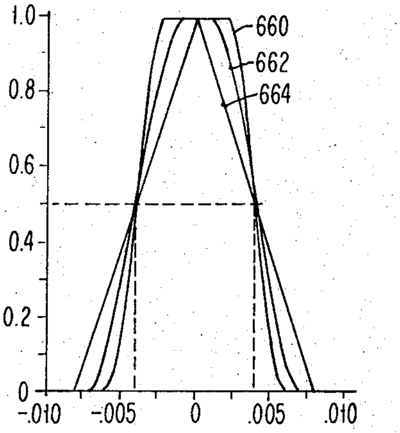

FIG. 13 shows a similar set of curves for the "Star" configuration. The curves 660, 662 and 654 represent 0°, 3° and 5.625° angles of orientation. Note that 100 percent area is obtained for all orientations. At ±5.625°, the curve is a perfect triangle due to symmetry. The slopes of these curves vary less drastically than those for the "daisy" configuration making it easier for electronic slop detection.

Figure 14:
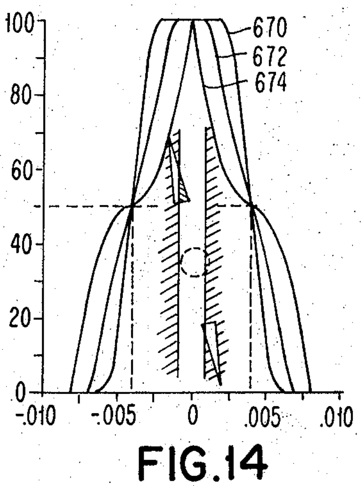

FIG. 14 shows a set of curves 670, 672 and 674 for the "half-star" variation. Of particular interest is the unusual curve 674 produced by the "Half-Star" configuration at the transition angle of 5.625°. The double inflection at the 50 percent line is useful for transition detection in certain applications since for only a slight change in orientation angle there is a drastic slope change.

Figure 15:
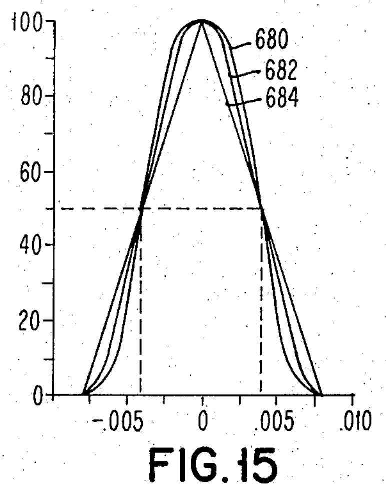

FIG. 15 shows a set of area-displacement curves 680, 682, 684 for the "segmented blade" array shown in FIG. 7(*d*). Note that the slopes of the curves vary only slightly as orientation angle increases. The curve for ±5.63° is triangular due to symmetry.

The "star" configuration affords definite advantages. With the orientation angle of ±5.63° the maximum signal that is produced in a narrow white space is constant and independent of angle; the converse is true for the minimum signal produced in a narrow black bar. This fact is useful in the design of electronic selection of the sector-couples and bar code detection circuitry using an automatic threshold technique similar to that described in U. S. Pat. No. 3,599,151 issued on the 10th day of August 1971 to Jerome Danforth Harr for "Character Recognition Photosensing Apparatus having a Threshold Comparator Circuit." There will always be at least one sector-couple of the "star" arrays which will produce the pre-defined maximum signal as it passes over a white space. Proper threshold setting will easily remove from consideration the sector-couples which are less optimally oriented.

The whole reason for using the instant approach is to make hand scanning apparatus less sensitive to dirt specks in the white areas and holidays in the black areas. Once a "star" array sector-couple has been selected within ±5.625°, it can be said that at the moment of maximum signal, 100 percent of the total blade area lies in the white space. Thus, dirt specks have the maximum possibility of being "absorbed" in the signal. The converse is true for the case of scanning a narrow black bar.

It can be seen by a comparison of the curves of FIG. 12 with those of FIGS. 13 and 15 that the "star" configuration produces waveforms with more uniform slopes. This fact simplifies the design of any slope-detection circuitry that is required. Note that in FIG. 14, the double-inflection point may be advantageous in some situations for detecting transition between blade pairs since the slope changes so drastically with a very slight change in orientation angle.

Although sharp tip angles have been shown and described, it should be understood that truncated and/or rounded tips are contemplated both as a matter of design and as a result of manufacturing limitations and/or tolerances.

While the invention has been shown and described particularly with reference to preferred embodiments thereof, and various alternatives have been suggested, it should be understood that those skilled in the art may effect still further changes without departing from the spirit and scope of the invention as defined hereinafter.

The invention claimed is:

1. Optical bar coding scanning apparatus for recovering information encoded in a series of elongated parallel bars laid down on a document in contrasting characteristic to that of said document, comprising a photosensitive device arranged for receiving light from said document being scanned, said photosensitive device having a configuration of a multiple of photosensitive sectors insulated from each other and having longitudinal axes radiating outwardly from the center of said device at relatively small angles with respect to the longitudinal axes of contiguous sectors, electronic circuitry additively connecting said sectors in couples comprising diametrically collinear sectors for generating electric levels proportional to the light received, and said photosensitive sectors having configurations in which lines defining the outer edges intersect at points remote from said center of said device.

2. Optical bar coding scanning apparatus as defined in claim 1, and wherein said photosensitive sectors extend from a circle of radius substantially one-half the distance from said center to said points remote from said center.

3. Optical bar coding scanning apparatus as defined in claim 1 and wherein said photosensitive sectors each comprise two additional sectors intermediate said center and the contiguous first-said sector.

4. Optical bar coding scanning apparatus as defined in claim 3 and wherein said two additional sectors have edges colinear to said outer edges of the contiguous first-said sectors.

5. Optical bar coding scanning apparatus as defined in claim 1 and wherein said electric circuitry is arranged for imparting effective rotation at said pupil by connecting the couples of said photosensitive device sequentially.

6. Optical bar coding scanning apparatus as defined in claim 2 and incorporating a photosensitive section insulated from said sectors and interposed therebetween at said center, and connections from said section to said electronic circuitry for increasing the effective area of said sector-couples.

7. Optical bar coding scanning apparatus as defined in claim 6 and wherein said section is circular in configuration.

8. Optical bar coding scanning apparatus as defined in claim 1 and wherein said sectors have substantially triangular configuration.

9. Optical bar coding scanning apparatus as defined in claim 1 and wherein said sectors have a substantially rhombic configuration extending outwardly from the center of said device.

10. Optical bar coding scanning apparatus as defined in claim 9 and wherein said rhombic configuration is defined by lines of substantially equal length.

11. Optical bar coding scanning apparatus as defined in claim 1 and wherein said lines are arranged at an angle $2\theta$ with respect to each other where $\theta$ is $360°/2n$ and where $n$ is the number of photosensitive sectors in said device, and said angle is subtended by a circle at the center of said device of diameter substantially equal to the minimum spacing to be resolved between said bars.

12. Optical bar coding scanning apparatus as defined in claim 1 and wherein said lines are collinear with lines tangent to a circle of whose diameter 2R is substantially equal to the minimum spacing to be resolved between said bars.

13. Optical bar coding scanning apparatus as defined in claim 1 and wherein said lines defining the outer edges of each of said photosensitive sectors lie at an angle subtended by a circle at the center of said device of diameter not greater than the minimum spacing to be resolved between said bars.

14. Optical bar coding scanning apparatus as defined in claim 3 and wherein said additional sectors are of substantially triangular configuration with two lines thereof tangent to a circle at the center of said device of diameter not greater than the minimum spacing to be resolved between said bars.

15. Optical bar coding scanning apparatus as defined in claim 6 and wherein said photosensitive section has a maximum dimension through the center of said device not greater than the minimum spacing to be resolved between said bars.

16. Optical bar coding scanning apparatus as defined in claim 7 and wherein said photosensitive section has a diameter not greater than the minimum spacing to be resolved between said bars.

17. Optical bar coding scanning apparatus as defined in claim 8 and wherein said sectors of triangular configuration have bases no wider than the minimum spacing to be resolved between said bars.

18. Optical bar coding scanning apparatus as defined in claim 9 and wherein said sectors have minor diagonals no greater than the minimum spacing to be resolved between said bars.

19. Optical bar coding scanning apparatus as defined in claim 1 incorporating a photosensitive section insulated from said sector and interposed therebetween at said center of said device, and electric connections additively coupling said section to at least one sector-couple, said section having a maximum dimension through said center of said device not greater than the minimum spacing to be resolved between bars.

* * * * *